Patented June 25, 1946

2,402,640

UNITED STATES PATENT OFFICE 2,402,640

CHEMICAL PROCESSES AND PRODUCT

Wilbur A. Lazier, New Castle County, and Frank K. Signaigo, Wilmington, Del., assignors to E. I. du Pont de Nemours & Company, Wilmington, Del., a corporation of Delaware No Drawing. Application September 19, 1940, Serial No. 357,417

15 Claims. (Cl. 260—609)

1

This invention relates to hydroxythiols and to a process for their preparation.

The hydroxythiols of this invention have received practically no industrial or academic attention for the reason that no practicable methods for their preparation have been known. Since hydroxythiols constitute a unique group of materials having the properties of thiols, combined with water solubility, it is to be expected that such materials will find many important uses, if the hydroxythiols can be obtained from cheap raw materials.

This invention has as an object the preparation of certain new and useful compounds. Another object is to prepare hydroxythiols by a simple and direct process. Still another object is to prepare hydroxythiols from readily available raw materials, such as sugars and other hydroxy aldehydes and ketones. Other objects will be apparent from the following description of the invention.

These objects are accomplished by the following invention which comprises catalytically hydrogenating a hydroxy thiocarbonyl compound or its sulfhydrate or substances which under the conditions of reaction give rise to such compounds. Preferably the reaction is carried out by catalytically hydrogenating an organic compound containing at least one hydroxyl group and a carbonyl group in the presence of hydrogen sulfide.

In practicing this invention it is preferred to form and hydrogenate the thiocarbonyl compound in a single operation. To accomplish this a hydroxycarbonyl compound, for example, a reducing sugar, is dissolved in water and placed in a high pressure autoclave together with sulfur as a source of hydrogen sulfide and a sulfactive hydrogenation catalyst. The autoclave is then charged with hydrogen to a pressure of approximately 1500 lbs./sq. in. and agitated and heated to a temperature at which reaction proceeds at a suitable rate, usually in the neighborhood of 150° C. After the reaction is complete as evidenced by no further decrease in pressure, the autoclave is cooled and the contents filtered to separate the catalyst. The solution is then blown with nitrogen to remove excess hydrogen sulfide and extracted with ether, or steam distilled, to separate any water-insoluble by-products. The aqueous solution of hydroxy thiol may be used as such or the water may be removed by heating the solution under reduced pressure leaving the hydroxythiol as a non-volatile residue.

The following specific examples show in greater detail the manner of practicing this invention

2 in several of its modifications. In the examples, the amounts of materials referred to are parts by weight.

Example I

Sixty-five parts of commercial dextrose and 30 parts of powdered sulfur are charged into a hydrogenation autoclave together with 100 parts of water and 8 parts of a cobalt sulfide catalyst prepared by precipitating an aqueous solution of 13 parts of cobalt chloride hexahydrate with a solution of 16 parts of sodium polysulfide. Hydrogen is admitted to the autoclave to a pressure of 1500 lbs./sq. in and the autoclave is agitated, and heated to 125° C. At this temperature a rapid reaction ensues as evidenced by the decrease in pressure and it is necessary to add additional hydrogen from time to time to maintain the pressure within the range from 1300 to 1900 lbs./sq. in. After one hour, hydrogen is absorbed more slowly and the autoclave is heated at 150° C. for an additional three hours to insure completion of the reaction. The autoclave is then cooled and the products are rinsed out with water and filtered to separate the catalyst. The aqueous solution is then blown with nitrogen until the excess hydrogen sulfide is removed. The solution is extracted twice with ether to remove any ether-soluble by-products. The aqueous solution is then heated at 100° C. under a pressure of 10–15 mm. until substantially all of the water is removed. Fifty-three parts of an amber-colored viscous syrup is obtained as the non-volatile residue. It is miscible with water in all proportions and readily soluble in dilute ethanol but substantially insoluble in anhydrous methanol, ethanol, acetone, ether, dioxan, and hydrocarbon solvents. The product contains 13.0% of thiol sulfur and 15.3% of total sulfur. This analysis indicates that the product contains 81% of 1-thiosorbitol. The 1-thiosorbitol can be crystallized by cooling a concentrated solution of the crude product in a mixture of anhydrous pyridine and ethanol. It forms white crystals which melt at 89° to 92° C. 1-thiosorbitol may be oxidized with dilute aqueous hydrogen peroxide or iodine to the corresponding disulfide, a white crystalline compound which melts at 126° to 128° C. The thiosorbitol is characterized further by forming a crystalline, water-insoluble, dodecyl thioether when warmed in aqueous dioxan solution with alkali and dodecyl bromide. The sorbityl-1 dodecyl-1 thioether $$(CH_2OH(CHOH)_4CH_2-S-(CH_2)_{11}-CH_3)$$

is a white solid which melts at 107° C. to a liquid crystalline state and on further heating changes to a clear liquid at 183 to 185° C. The synthesis of the thiol may be formulated as follows:

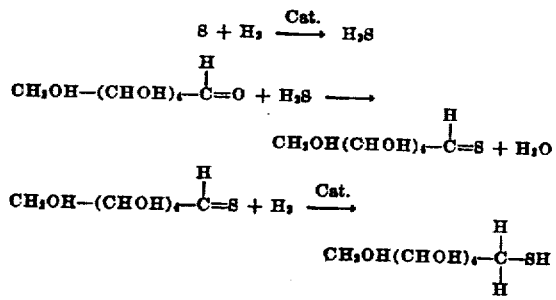

Example II

The experiment of the preceding example is repeated using the same reactants and conditions except that 6 parts of finely divided pyrophoric iron is substituted for the cobalt sulfide catalyst. The iron is prepared by extracting the aluminum with boiling caustic solution from 12 parts of a finely ground alloy of equal parts of iron and aluminum. During the period of heating the autoclave, the iron powder reacts with some of the sulfur, forming active iron sulfide which is the hydrogenation catalyst. On working up the reaction mixture as described above there is obtained 45 parts of crude 1-thiosorbitol.

Example III

Fifty parts of commercial laevulose and 25 parts of powdered sulfur are charged into an autoclave together with 150 parts of water and 6 parts of cobalt sulfide catalyst prepared by treating finely divided pyrophoric cobalt metal with hydrogen sulfide at room temperature until sulfidation is substantially complete. Hydrogen is forced into the autoclave to a pressure of 1000 lbs./sq. in. and the autoclave is agitated and heated to 150° C. Rapid reaction ensues and more hydrogen is added from time to time to maintain the pressure within the range of 1000 to 1500 lbs./sq. in. The total pressure decrease amounts to 1750 lbs./sq. in. After the absorption of hydrogen has ceased, the autoclave is cooled and the reaction mixture is rinsed out with water and filtered to remove the catalyst. The aqueous solution is blown with nitrogen to remove the excess hydrogen sulfide and is then extracted with ether to remove ether-soluble by-products. Evaporation of the aqueous solution yields 16 parts of a viscous syrup containing 9.5% of thiol sulfur. The thiol sulfur analysis indicates that this material contains 30% of the corresponding hydroxythiol presumably a mixture of 2-thiosorbitol and 2-thiomannitol. The synthesis of the thiol may be formulated as follows:

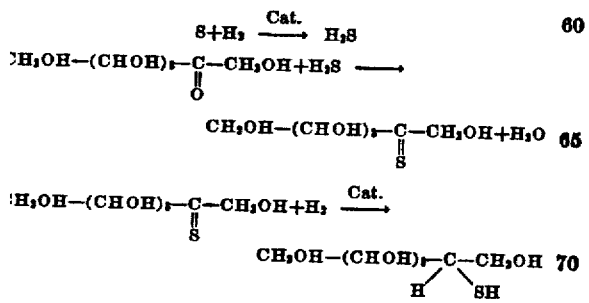

Evaporation of the ether extract yields 7 parts of a fluid which contains 10.7% of thiol sulfur and 32.2% of total sulfur. This ether-soluble by-product is presumably a mixture of such compounds of thiovalerolactone, 4-thiovaleric acid, and 2-thiomethyl-5-hydroxy-methylthiophene. These thiol compounds may be formed from the carbonyl compounds that result from the dehydration of laevulose.

Example IV

Fifty parts of commercial maltose and 25 parts of sulfur are charged into an autoclave with 100 parts of water and 5 parts of a cobalt sulfide catalyst prepared by precipitating an aqueous solution of cobalt chloride hexahydrate with a solution of sodium trisulfide. The autoclave is charged with hydrogen to a pressure of 1500 lbs./sq. in. and agitated and heated at 150° C. for four hours. The hydrogen absorption corresponds to a pressure drop of 900 lbs./sq. in. The autoclave is then cooled, rinsed out with water, and the contents filtered to separate the catalyst. The solution is blown with nitrogen to remove the excess hydrogen sulfide and extracted with ether to remove ether-soluble impurities. Removal of the water by heating the solution at 100° C. under reduced pressure yields 44 parts of a viscous residue containing 11.1% of thiol sulfur and 12.5% of total sulfur. Since more than one mole of thiol is obtained for each mole of maltose treated, at least part of the maltose is hydrolyzed during the process to dextrose. The product therefore contains 1-thiosorbitol and probably also the hemiacetal:

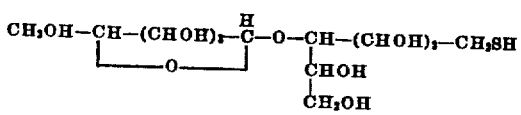

Example V

Fifty parts of soluble starch and 20 parts of sulfur are charged into an autoclave together with 50 parts of acetic acid, 75 parts of water, and 5 parts of cobalt sulfide catalyst prepared as in Example I. Hydrogen is added to the autoclave to a pressure of 2000 lbs./sq. in. and the autoclave agitated and heated at 150° C. for 6 hours. During this time the total pressure decrease is 1300 lbs./sq. in. The autoclave is cooled and the reaction mixture is filtered to separate the catalyst. The clear aqueous solution is blown with nitrogen to remove the excess hydrogen sulfide. Evaporation of the aqueous solution under reduced pressure at 100° C. yields 39 parts of a viscous syrup, containing 8.2% of thiol sulfur.

The hydroxythiols so obtained are presumably formed by hydrogenation of the thiocarbonyl compounds resulting from the hydrolysis and hydrosulfolysis of the starch.

Example VI

Sixty-five parts of commercial sucrose and 30 parts of sulfur are charged into an autoclave together with 8 parts of precipitated nickel polysulfide and 100 parts of water. The autoclave is filled with hydrogen to a pressure of 1000 lbs./sq. in. and agitated and heated at 150° C. for 5 hours. During this period it is necessary to add hydrogen to replace that absorbed and to maintain the pressure above 1000 lbs./sq. in. After cooling the autoclave the reaction mixture is filtered to separate the catalyst and blown with nitrogen to remove the excess hydrogen sulfide. After extracting the aqueous solution with ether to remove ether-soluble by-products, the water is distilled from the product at reduced pressure. The non-volatile product is obtained as the distillation residue. It is an amber-colored, viscous syrup containing thiol sulfur equivalent to 22 parts of pentahydroxyhexanethiols, presumably 1-thiosorbitol, 2-thiosorbitol, and 2-thiomannitol.

*Example VII*

Sixty-six parts of commercial aldol and 48 parts of sulfur are charged into an autoclave together with 66 parts of dioxan solvent and 6 parts of cobalt polysulfide prepared as described in Example I. Hydrogen is admitted to the autoclave to a pressure of 1200 lbs./sq. in. and the autoclave is stirred and heated at 125° C. for 6 hours. During this period hydrogen is added to the autoclave to maintain the total pressure within the range from 1200 to 2000 lbs./sq. in. After filtering the reaction mixture from the catalyst and removing the excess hydrogen sulfide, titration of an aliquot of the product indicates the presence of 0.935 mole of thiol for each 100 grams of aldol charged. Vacuum distillation of the reaction mixture yields a liquid fraction boiling at 71° C. at about 18 mm. pressure which consists of a mixture of 3-hydroxybutanethiol-1 and butane-dithiol-1,3. A second fraction is a thiol boiling at 81° C. at about 3 mm. pressure. It is apparently 3-hydroxybutyl 3-mercaptobutyl sulfide. The dithiol and the thioether may be formed by addition of hydrogen sulfide and hydroxybutanethiol respectively to crotonaldehyde followed by conversion of the aldehyde group to a thiol group. The crotonaldehyde results from dehydration of a part of the aldol.

The process of this invention is applicable broadly to organic compounds containing both hydroxyl and carbonyl or thiocarbonyl groups. The foregoing examples have illustrated the conversion of specific compounds to hydroxythiols but other hydroxycarbonyl compounds may be similarly converted to hydroxythiols. Additional examples of these are hydroxyaldehydes such as glycolic aldehyde; 2-ethyl-3-hydroxyhexaldehyde and other aldol condensation products of aldehydes; glyceric aldehyde; formaldehyde condensation products; aldose sugars; hydroxyketones such as monohydroxyacetone; symmetrical dihydroxyacetone; 3-hydroxybutanone-2; 4-hydroxy-4-methylpentanone-2; and the ketose sugars. Examples of specific classes and members of the sugar group are the pentoses such as arabinose and xylose; hexoses such as dextrose, laevulose, mannose, and galactose; bioses such as maltose, lactose and cellobiose.

In addition to the reducing sugars which have free aldehyde or keto groups, polyhydroxythiols may also be obtained by the process of this invention from raw materials such as di- and polysaccharides having no free carbonyl groups. Under the conditions of the reaction and particularly in the presence of acids to accelerate the hydrolysis, the di- and polysaccharide compounds are converted to substances possessing free aldehyde or keto groups which then undergo conversion to the hydroxythiols. Examples of compounds of this type are disaccharides such as sucrose and higher saccharides such as the pentosans, starches, glycogen, dextrins, and celluloses. Broadly, therefore, carbohydrates may be converted to hydroxythiols by the process of this invention. Carbohydrates that have been partially or completely acylated or etherified may also be converted to acyloxy- or alkoxythiols by this invention. Examples of compounds of this class are cellulose acetate, cellulose propionate, methyl cellulose, ethyl cellulose, glucosides, and acetylated or etherified sugars. Other starting materials that may be converted to polyhydroxythiols according to the process of this invention are carbohydrate mixtures and crude sugar syrups such as corn syrup and molasses.

The normal product obtained by the hydrogenation of a hydroxycarbonyl compound in the presence of hydrogen sulfide is the hydroxythiol in which the thiol group is attached to the carbon atom originally forming the carbonyl group. This is illustrated by the following equation in which R represents a hydroxylated alkyl group and R' represents an alkyl or hydroxylated alkyl group or hydrogen:

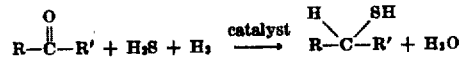

In the case of sugars, it is known that the carbonyl group does not exist completely in the free form but is usually linked with one of the hydroxyl groups in the molecule to form a cyclic hemiacetal. It is believed that this hemiacetal behaves like a normal carbonyl compound in the process of this invention and that the principal thiol product is that having the thiol group attached to the carbon atom originally bearing the carbonyl oxygen atom as illustrated by the following equation:

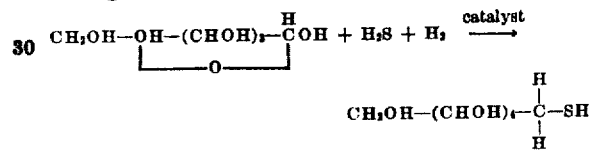

However, the invention is not limited by these considerations as it is possible that a thiol group enters another portion of the molecule and in fact polythiols may be formed to some extent also by replacement of one or more of the hydroxyl groups by sulfhydryl groups. Dehydration products of the polyhydroxythiols may also be formed during the process.

There is frequently formed in this process a minor proportion of hydroxy sulfur compounds in which not all of the sulfur is present as thiol sulfur. For example, the unconverted carbonyl compound may react with already formed thiol to yield a thiohemiacetal or dithioacetal (or ketal) as illustrated by the following hypothetical equations in which an aldohexose is used as a typical starting material:

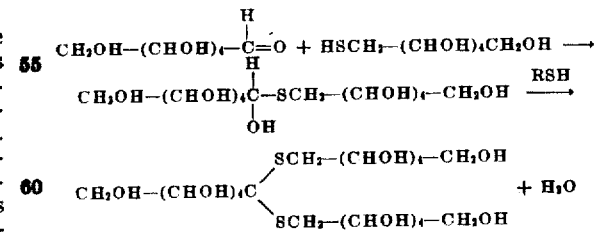

The presence of such compounds in the crude products is indicated by the fact that the total sulfur content is usually somewhat higher than the thiol sulfur content of the product. The formation of thioacetals may be repressed by employing a large excess of hydrogen sulfide in the process and conversely the proportion of thioacetal products may be increased by using less hydrogen sulfide.

In carrying out the process of this invention, it is usually desirable to employ a solvent or liquid medium. Since most of the common hydroxy-carbonyl compounds are soluble in water, this is the preferred solvent. Water is also preferred for use in the conversion of polysaccharides by this process. Pyridine and dimethylamides may also be employed as solvents. For those hydroxycarbonyl compounds that are insoluble in water or that yield water-insoluble hydroxythiols, solvents such as alcohols, ethers, and hydrocarbons are preferred. Other materials may be present, if desired, such as organic or mineral acids, alkalies, ammonia, or amines. The use of an acid is particularly advantageous when employing a polysaccharide as the starting material.

The use of sulfur as a source of hydrogen sulfide in carrying out this process has been described. However, hydrogen sulfide itself may be charged into the autoclave together with the other reactants or other sulfur compounds may be used that are converted to hydrogen sulfide under the reaction conditions. Examples of such materials, in addition to elementary sulfur, are sulfur dioxide, ethyl tetrasulfide, carbon bisulfide and alkali or ammonium sulfides. The proportion of hydrogen sulfide to carbonyl compound employed may be varied considerably. However, it is usually preferred to use an excess of hydrogen sulfide or source of hydrogen sulfide over the theoretical amount, the latter being one mole of hydrogen sulfide for each mole of monocarbonyl compound.

The process of this invention may be operated at temperatures ranging from about 100 to about 200° C. and at pressures above atmospheric. However, at the lower temperatures and pressures the reaction may not proceed with convenient rapidity while at the higher temperatures excessive decomposition of the starting material or product may occur. Consequently it is preferred to operate at temperatures of 125 to 175° C. and at total pressures of at least 100 lbs./sq. in. in order that the reaction will proceed at a convenient rate.

A variety of sulfactive hydrogenation catalysts may be used in carrying out the process of this invention. It has been found that certain metal sulfides are especially suitable for use in this process since these are not poisoned by sulfur and are at the same time highly active. Examples of these are sulfides of the common hydrogenating metals such as chromium, cobalt, copper, iron, lead, nickel, molybdenum, palladium, tin, tungsten, and vanadium. It is preferred, however, to employ sulfides of the metals, cobalt, molybdenum, nickel, and iron since these are exceptionally active. Such catalysts may be prepared by a variety of methods as for example by precipitating the metal sulfide from a solution of a metal salt with hydrogen sulfide, a solution of alkali or alkaline earth metal sulfide or polysulfide, or with ammonium sulfide or polysulfide. Another method that has been found to yield very active hydrogenation catalysts is to treat the finely divided pyrophoric or activated metal suspended in a liquid medium with hydrogen sulfide or sulfur until sulfidation is substantially complete. Other methods for obtaining metal sulfide catalysts include heating powdered metals or metal compounds such as the oxides or carbonates with volatile sulfiding agents such as sulfur, hydrogen sulfide, or carbon bisulfide.

By the term "sulfactive hydrogenation catalyst" as used herein and in the claims, we mean a catalyst prepared as described in U. S. Patents No. 2,221,804 and 2,230,390 and which is active for the catalytic hydrogenation of the sulfur in organic multisulfides, organic sulfur compounds having carbon-to-sulfur unsaturation, and organic sulfur compounds having sulfur-to-oxygen unsaturation.

Frequently, the hydrogenating activity of the metal sulfides may be increased by treatment with hydrogen at elevated temperatures. The hydrogen treatment of the metal sulfide in many cases can be combined conveniently into a single operation with the hydrogenation reaction for which the catalyst is to be used.

Instead of charging the metal sulfide as such, it may be formed in situ by placing the finely divided pyrophoric or activated metal into the autoclave together with the reactants. The sulfur or hydrogen sulfide present will convert the metal to the active metal sulfide in the early stages of the reaction process. The catalyst employed may be substantially a pure metal sulfide or a combination of metal sulfides. Other substances may be present also, as for example, kieselguhr, alumina, magnesia, carbon, and other supporting or promoter substances.

In practicing this invention, it is especially convenient to convert the hydroxycarbonyl compound to the corresponding hydroxythiol in a single operation as has been described. It is, however, within the scope of this invention to react a hydroxycarbonyl compound with hydrogen sulfide by any suitable process and subsequently to react the hydroxythiocarbonyl compound or other sulfur derivative so formed with hydrogen in the presence of a sulfactive hydrogenation catalyst. This two-step process may be formulated as follows:

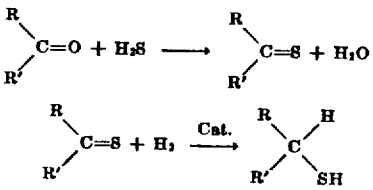

Thioaldehydes and thioketones that may be hydrogenated according to this invention may also be obtained by other conventional methods such as by treating the aldehyde or ketone with phosphorus pentasulfide. Specific hydroxythiocarbonyl compounds that may be hydrogenated to hydroxythiols are the thiocarbonyl compounds corresponding to each of the carbonyl compounds mentioned above as for example: glycolic thioaldehyde, 1 - hydroxypropanethione-2, thiodextrose (thioglucose) thiolaevulose, thiomannose, and thiosugars in general and the sulfhydrates of hydroxythiocarbonyl compounds.

The conditions for hydrogenating hydroxythiocarbonyl compounds to hydroxythiols are the same as those already described for the combined formation and hydrogenation of these substances except that the presence of hydrogen sulfide during the hydrogenation operation is not essential.

This invention constitutes a useful and economical process for preparing hydroxythiol compounds. These products, most of which have hitherto been unknown, include a new class of organic compounds, the water-soluble multihydroxythiols. These include the products obtained by reacting a carbohydrate with hydrogen and hydrogen sulfide in the presence of a sulfactive hydrogention catalyst. These compounds are useful as chemical intermediates for surface active agents and have definite applica-

We claim:

1. The process for the preparation of hydroxyaliphatic thiols which comprises reacting an organic hydroxycarbonyl compound with hydrogen and a substance selected from the group consisting of elementary sulfur, hydrogen sulfide and compounds yielding hydrogen sulfide during said reaction in the presence of a sulfactive hydrogenation catalyst at a temperature within the range of 100° to 200° C. and under a superatmospheric pressure.

2. The process for the preparation of hydroxyaliphatic thiols which comprises reacting a carbohydrate with hydrogen and a compound selected from the group consisting of elementary sulfur, hydrogen sulfide, and compounds yielding hydrogen sulfide during said reaction in the presence of a sulfactive hydrogenation catalyst at a temperature within the range of 100° to 200° C. under a superatmospheric pressure.

3. The process for the preparation of hydroxyaliphatic thiols which comprises reacting with hydrogen and hydrogen sulfide a compound selected from the class consisting of hydroxy aliphatic thiocarbonyl compounds containing at least 4 carbon atoms and compounds which during said reaction give rise to such hydroxyaliphatic thiocarbonyl compounds in the presence of a sulfactive hydrogenation catalyst at a temperature within the range of 100° to 200° C. and under a superatmospheric pressure.

4. The process for the preparation of hydroxyaliphatic thiols which comprises reacting an organic hydroxycarbonyl compound with hydrogen and a substance selected from the group consisting of elementary sulfur, hydrogen sulfide and compounds yielding hydrogen sulfide during said reaction in the presence of a metal sulfide sulfactive hydrogenation catalyst at a temperature within the range of 100° to 200° C. and under a superatmospheric pressure.

5. The process in accordance with claim 1 characterized in that the organic hydroxycarbonyl compound is a hydroxyaldehyde.

6. The process in accordance with claim 1 characterized in that the organic hydroxycarbonyl compound is dextrose.

7. The process in accordance with claim 1 characterized in that the organic hydroxycarbonyl compound is a hydroxyketone.

8. The process in accordance with claim 1 characterized in that the organic hydroxycarbonyl compound is laevulose.

9. As a new compound a polyhydroxyhexanethiol.

10. As a new compound a pentahydroxyhexanethiol.

11. As a new compound 1-thiosorbitol.

12. The process in accordance with claim 4 characterized in that the catalyst is a sulfide of a metal of the iron group.

13. The process in accordance with claim 4 characterized in that the catalyst is molybdenum sulfide.

14. The process in accordance with claim 4 characterized in that the catalyst is a metal polysulfide obtainable by precipitation of a soluble iron group metal salt with a substance selected from the group consisting of the sulfides and polysulfides of the alkali metals, the alkali earth metals, and ammonia.

15. An aliphatic polyhydroxy thiol containing at least 4 carbon atoms and having the identical configuration of a member of the group of compounds known as aldose and ketose sugars except that the carbonyl group has been replaced with the

group.

WILBUR A. LAZIER.
FRANK K. SIGNAIGO.

---

Certificate of Correction

June 25, 1946.

Patent No. 2,402,640.

WILBUR A. LAZIER ET AL

It is hereby certified that errors appear in the printed specification of the above numbered patent requiring correction as follows: Column 4, line 2, for "pounds of" read *pounds as*; column 6, line 30, for that portion of the equation reading "CH₂OH—OH—" read $CH_2OH$—$CH$—; and that the said Letters Patent should be read with these corrections therein that the same may conform to the record of the case in the Patent Office.

Signed and sealed this 17th day of September, A. D. 1946.

[SEAL]

LESLIE FRAZER,
*First Assistant Commissioner of Patents.* tions in the art of cleaning and preventing the corrosion of metals.

It is apparent that many widely different embodiments of this invention may be made without departing from the spirit and scope thereof and therefore it is not intended to be limited except as indicated in the appended claims.

We claim:

1. The process for the preparation of hydroxyaliphatic thiols which comprises reacting an organic hydroxycarbonyl compound with hydrogen and a substance selected from the group consisting of elementary sulfur, hydrogen sulfide and compounds yielding hydrogen sulfide during said reaction in the presence of a sulfactive hydrogenation catalyst at a temperature within the range of 100° to 200° C. and under a superatmospheric pressure.

2. The process for the preparation of hydroxyaliphatic thiols which comprises reacting a carbohydrate with hydrogen and a compound selected from the group consisting of elementary sulfur, hydrogen sulfide, and compounds yielding hydrogen sulfide during said reaction in the presence of a sulfactive hydrogenation catalyst at a temperature within the range of 100° to 200° C. under a superatmospheric pressure.

3. The process for the preparation of hydroxyaliphatic thiols which comprises reacting with hydrogen and hydrogen sulfide a compound selected from the class consisting of hydroxy aliphatic thiocarbonyl compounds containing at least 4 carbon atoms and compounds which during said reaction give rise to such hydroxyaliphatic thiocarbonyl compounds in the presence of a sulfactive hydrogenation catalyst at a temperature within the range of 100° to 200° C. and under a superatmospheric pressure.

4. The process for the preparation of hydroxyaliphatic thiols which comprises reacting an organic hydroxycarbonyl compound with hydrogen and a substance selected from the group consisting of elementary sulfur, hydrogen sulfide and compounds yielding hydrogen sulfide during said reaction in the presence of a metal sulfide sulfactive hydrogenation catalyst at a temperature within the range of 100° to 200° C. and under a superatmospheric pressure.

5. The process in accordance with claim 1 characterized in that the organic hydroxycarbonyl compound is a hydroxyaldehyde.

6. The process in accordance with claim 1 characterized in that the organic hydroxycarbonyl compound is dextrose.

7. The process in accordance with claim 1 characterized in that the organic hydroxycarbonyl compound is a hydroxyketone.

8. The process in accordance with claim 1 characterized in that the organic hydroxycarbonyl compound is laevulose.

9. As a new compound a polyhydroxyhexanethiol.

10. As a new compound a pentahydroxyhexanethiol.

11. As a new compound 1-thiosorbitol.

12. The process in accordance with claim 4 characterized in that the catalyst is a sulfide of a metal of the iron group.

13. The process in accordance with claim 4 characterized in that the catalyst is molybdenum sulfide.

14. The process in accordance with claim 4 characterized in that the catalyst is a metal polysulfide obtainable by precipitation of a soluble iron group metal salt with a substance selected from the group consisting of the sulfides and polysulfides of the alkali metals, the alkali earth metals, and ammonia.

15. An aliphatic polyhydroxy thiol containing at least 4 carbon atoms and having the identical configuration of a member of the group of compounds known as aldose and ketose sugars except that the carbonyl group has been replaced with the

group.

WILBUR A. LAZIER.
FRANK K. SIGNAIGO.

---

Certificate of Correction

June 25, 1946.

Patent No. 2,402,640.

WILBUR A. LAZIER ET AL

It is hereby certified that errors appear in the printed specification of the above numbered patent requiring correction as follows: Column 4, line 2, for "pounds of" read *pounds as*; column 6, line 30, for that portion of the equation reading "CH₂OH—OH—" read *CH₂OH—CH—*; and that the said Letters Patent should be read with these corrections therein that the same may conform to the record of the case in the Patent Office.

Signed and sealed this 17th day of September, A. D. 1946.

[SEAL]

LESLIE FRAZER,
*First Assistant Commissioner of Patents.*